United States Patent [19]

Gordon

[11] 3,855,965

[45] Dec. 24, 1974

[54] AUTOMATIC BREADING DEVICE

[76] Inventor: Jerry D. Gordon, 10765 E. 11th St., Tulsa, Okla. 74120

[22] Filed: June 21, 1973

[21] Appl. No.: 372,063

[52] U.S. Cl.................................... 118/16, 118/19
[51] Int. Cl............................ B05c 5/02, A23l 1/31
[58] Field of Search......... 118/16, 19, 17, 303, 418, 118/24

[56] References Cited
UNITED STATES PATENTS

| | | | |
|---|---|---|---|
| 2,970,563 | 2/1961 | Hunter.................................. | 118/19 |
| 3,469,561 | 9/1969 | Gordon................................. | 118/16 |

*Primary Examiner*—John P. McIntosh
*Attorney, Agent, or Firm*—William S. Dorman

[57] ABSTRACT

A device for breading pieces of raw chicken or the like comprising a plurality of separable elements adapted to be easily assembled and disassembled including a main cylinder mounted for rotation on a main cabinet, the main cylinder having a front and rear circular wall and a circular partition mounted between the front and rear walls; the device also includes a perforated sleeve which is adapted to be inserted through an opening in the front wall through and into an opening in the partition until a circular flange on the perforated cylinder is received within a sleeve on the partition; a pair of egg scoops are mounted at diametrically opposite positions on the end of the perforated cylinder opposite from the circular flange; a spiral member is also received within the perforated cylinder for the purpose of advancing raw chicken pieces through the perforated cylinder; the device further includes an elongated breading cylinder having a circumferential collar intermediate the ends thereof; a breading spiral is adapted to be received within the breading cylinder; the breading cylinder is inserted into the opening in the front wall of the main cylinder until the inserted end thereof abuts against the circular flange on the perforated cylinder at which time the collar is received within a sleeve on the front wall of the main cylinder; an opening is provided in the portion of the breading cylinder which is inserted into the main cylinder, and a flour scoop is adapted to be received in this opening; a portion of the breading cylinder projects forwardly and the same is provided with a series of circumferentially spaced openings adjacent the forward end of the breading cylinder to permit particles of flour and lumps of flour to pass therethrough; means are provided for introducing an egg wash solution into the annular space between the main cylinder and the perforated cylinder and for introducing flour into the annular space between the main cylinder and the breading cylinder.

4 Claims, 9 Drawing Figures

PATENTED DEC 24 1974          3,855,965

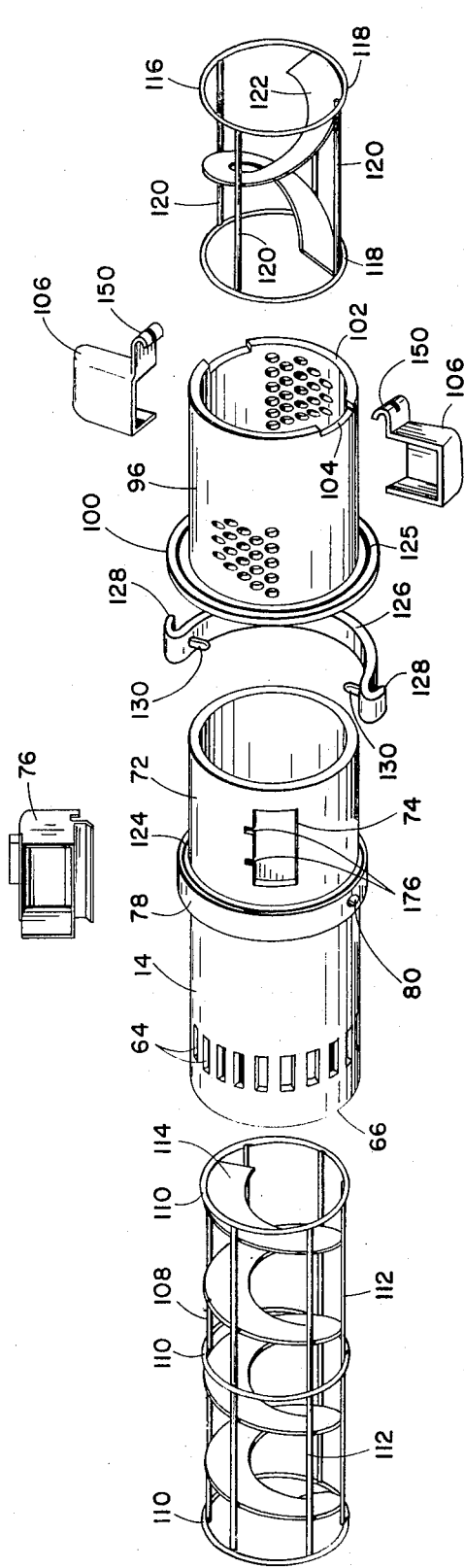
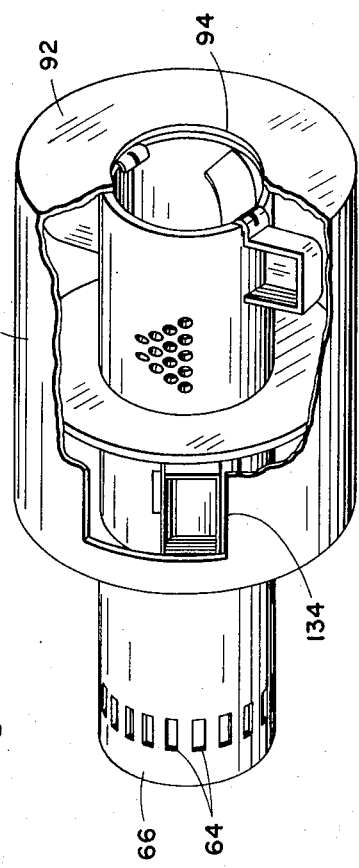
Fig. 5
Fig. 4

AUTOMATIC BREADING DEVICE

CROSS-REFERENCE TO RELATED APPLICATION

This application in part discloses, but does not claim, an access door which is more completely described and claimed in application Ser. No. 372,395, filed on June 21, 1973, and entitled "ACCESS DOOR FOR CYLINDER."

BACKGROUND OF THE INVENTION

1. Field of the Invention

The present invention relates to a device or machine for breading pieces of raw chicken or the like and, more particularly, this invention relates to a device or mechanism for breading pieces of raw chicken or the like automatically.

2. The Prior Art

There are a number of different devices and mechanisms on the market today for breading pieces of raw chicken or the like. One such device is disclosed in my prior U.S. Pat. No. 3,469,561, issued on Sept. 30, 1969, and entitled "TUMBLING DEVICE INCLUDING PLURAL COATING-SOURCE MEANS." In the foregoing patent, the breading device comprises a rotating cylinder containing a central screened duct, a draining cone and a final breading and discharge duct; food to be breaded before frying is fed into the central screened duct and liquid such as milk is supplied to one portion of the cylinder outside the screen; the flour and seasoning are supplied to another portion of the cylinder outside the screen and outside a conical drainage duct for the liquid; the flour and seasoning are thus fed to the breading and discharge duct by rotation of the cone.

SUMMARY OF THE INVENTION

The apparatus of the present invention includes a plurality of individual parts which are easily assembled and disassembled (for purposes of cleaning) to form a unitary breading device for pieces of raw chicken or the like. The main cylinder has a front circular wall, a rear circular wall and a central circular partition. The rear wall has an opening therein for the purpose of introducing raw pieces of chicken into the device. Both the front wall and the partition have forwardly projecting circular sleeves surrounding openings in these members. A perforated cylinder is adapted to be inserted into the opening in the partition. The perforated cylinder has a circular flange which is adapted to be received within the sleeve on the partition. Egg wash scoops are mounted diametrically opposite from each other on the end of the perforated cylinder opposite from the circular flange. A breading cylinder is provided with a circular collar intermediate the ends thereof. The breading cylinder is adapted to be inserted partway into the main cylinder until the circular collar is received within the sleeve on the front wall of the main cylinder. The interior portion of the breading cylinder is provided with an opening in which is received a flour scoop. The perforated cylinder is provided with a separable spiral vane and the breading cylinder is also provided with a separable spiral vane which extends for the full length of the breading cylinder. Means are provided for introducing egg wash solution into the annular space between the perforated cylinder and the main cylinder. Likewise, means are provided for introducing flour (and seasoning as well) into the annular space between the breading cylinder and the main cylinder. Thus, as the assembly is rotated, the egg wash scoops will pick up the egg wash solution and permit the same to pass into the interior of the perforated cylinder through the openings therein, thereby wetting the surfaces of the pieces of raw chicken. Again, as the unitary device rotates, the flour scoop will pick up flour and allow the same to pass through the opening in which the flour scoop is mounted, thus sprinkling flour over the surfaces of the thus wetted pieces of raw chicken. As the pieces of chicken pass through the remainder of the breading cylinder together with excess flour, the pieces are coated evenly with flour. The forward end of the breading cylinder is provided with a plurality of circumferentially spaced openings through which pieces of flour and lumps of flour are allowed to pass before the chicken is discharged from the forward end of the breading cylinder.

BRIEF DESCRIPTION OF THE DRAWINGS

FIG. 4 is a perspective of the main cylinder and associated components, with certain parts broken away;

FIG. 5 is an exploded view of the elements which are inserted into the main cylinder;

DESCRIPTION OF THE PREFERRED EMBODIMENT

Figure 1:
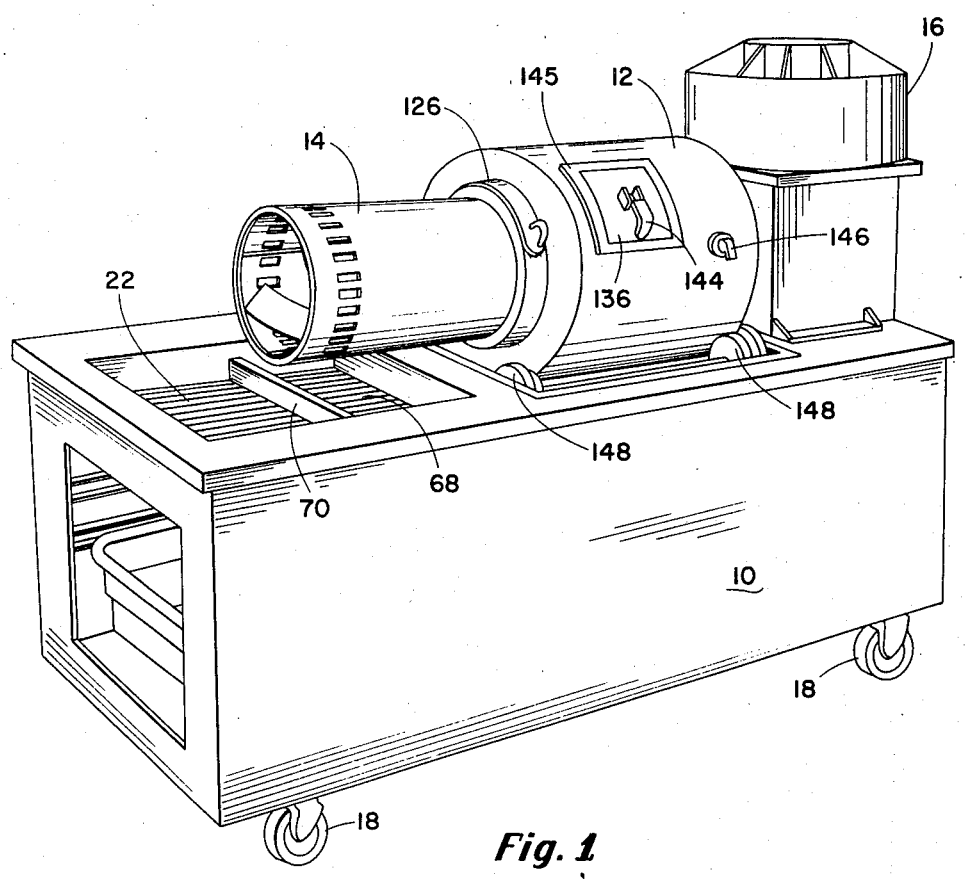
FIG. 1 is a perspective of a complete breading device made in accordance with the present invention.

Referring to the drawings in detail, FIG. 1 shows a main cabinet 10 upon which is rotatably mounted a main cylinder 12; a breading cylinder 14 is mounted coaxially within the main cylinder 12 in a manner later to be described. A feeder 16 is mounted adjacent one end of the main cabinet 10 and feeds particles of chicken, for example, into the main cylinder 12 in a manner later to be described. The main cabinet 10 is supported by a plurality of casters 18 so that the cabinet can be wheeled to the desired location of use.

Figure 2:
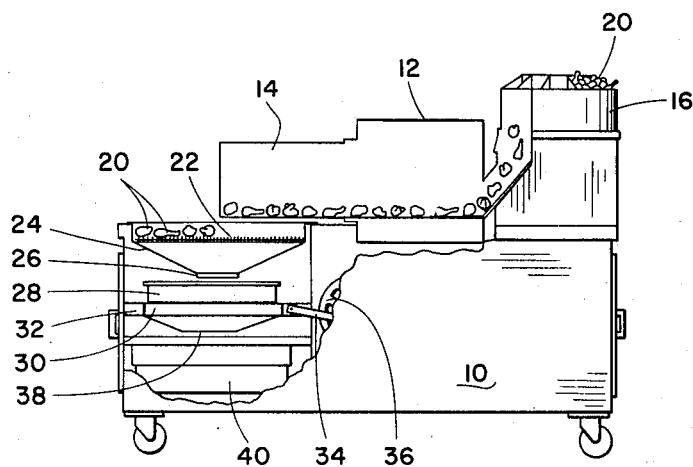
FIG. 2 is a semi-diagrammatic view, with certain parts broken away, showing the progress of the chicken pieces through the breading device of the present invention.

As shown semi-diagrammatically in FIG. 2, raw pieces 20 of chicken, or the like, are advanced from the feeder 16 into the interior of the main drum 12 where the pieces are first coated with an egg wash and then with a layer of flour so as to be "breaded"; the pieces of chicken, thus breaded, continue to move towards the left (with respect to FIG. 2) until they exit from the left-hand end of the breading cylinder 14 where they fall upon a wire rack 22. The pieces of breaded chicken 20 can be taken from the wire rack and placed in a fryer (not shown) for making fried chicken.

The wire rack 22 is supported adjacent the top of a flour chute 24, the latter having a bottom opening 26 positioned above a flour sifter 28. The flour sifter is generally similar to that shown in my prior U.S. Pat. No. 3,520,277 issued on July 14, 1970; thus, the flour sifter 28 will not be described in detail except to note that the flour sifter is mounted within a rectangular frame 30 which is slidable along a pair of tracks 32 (only one of which is shown in FIG. 2). The frame 30 and the flour sifter 28 are reciprocated as a unit by means of the push rod 34, which is pivotally connected at one end to the side of the rack 30 and at the other end to a crank (not shown) on a pulley 36. The sifter 28 is provided with an internal screen (not shown) and a bottom opening 38 through which the sifted flour passes downwardly into a stationary, but removable, flour pan 40. A motor (not shown) drives the pulley 36 through a small sheave (not shown) and a pulley belt (not shown).

Figure 3:
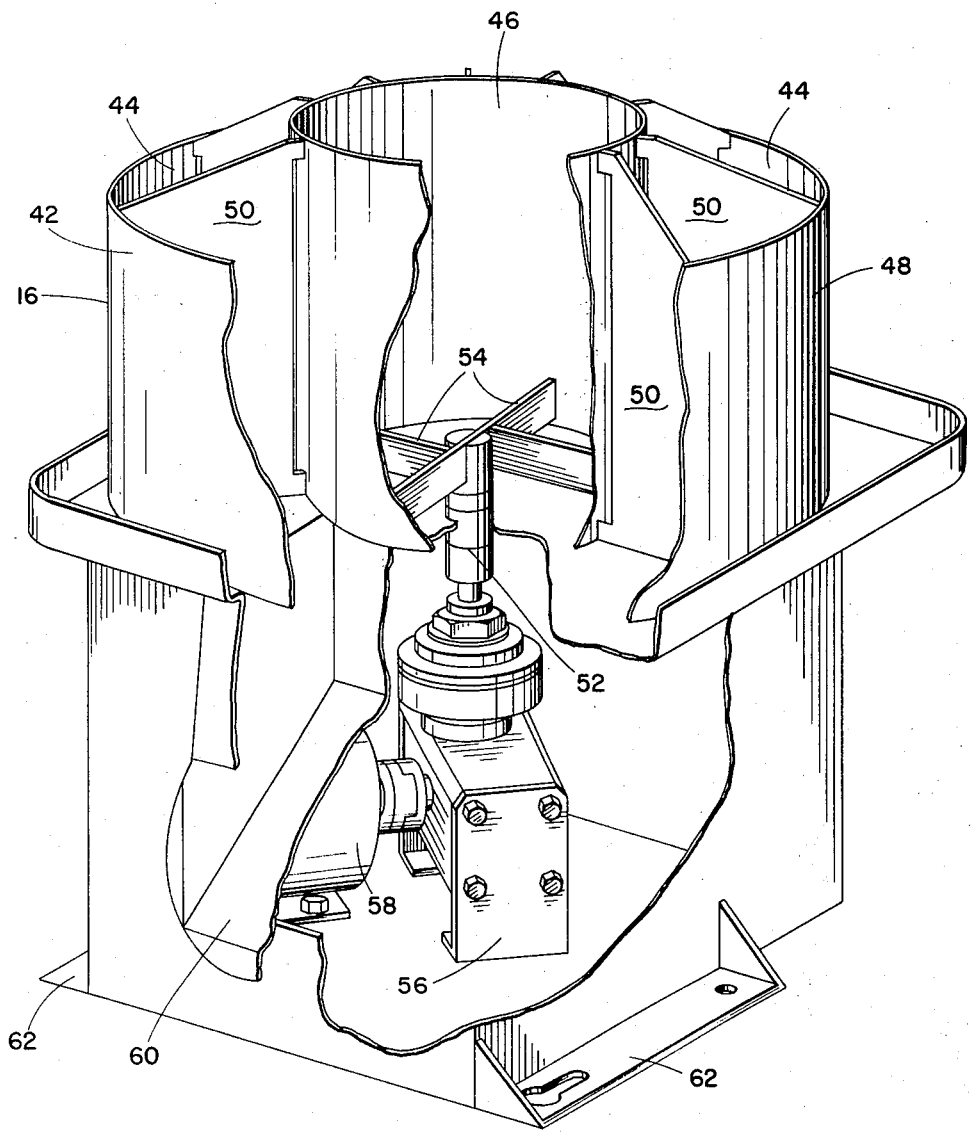
FIG. 3 is a perspective of the feeder per se, with certain parts broken away, to show the details of this feeder device.

The feeder 16 is shown in greater detail in FIG. 3. The feeder is broadly similar to that shown in my prior U.S. Pat. No. 3,567,070 issued on Mar. 2, 1971. The feeder 16 includes a rotatable feeder wheel 42 having a plurality of open-ended compartments 44 arranged or disposed in the annular space between a central cylindrical member 46 and the outside cylindrical surface 48 of the feeder wheel 42. A plurality of vertical plates 50 are arranged in radial disposition as shown to provide separation between adjacent compartments 44. The wheel 42 is rotated by means of a drive shaft 52, the upper end of which is connected to the inner cylindrical member 46 by means of a plurality of substantially radial arms 54. The lower end of the drive shaft 52 connects through a gear box 56 to a drive motor 58. The forward end of the feeder 16 is provided with an inclined chute 60, the upper end of which communicates with the lower open ends of the compartments 44. Thus, as the wheel 42 rotates, and as the lower end of each compartment 44 passes over the upper open end of the chute 60, the chicken pieces in that particular compartment will dump into the open end of the main cylinder 12 through the chute 60. The feeder 16 can be removably attached to the housing 10 by means of the brackets 62 and suitable bolts (not shown).

Referring now to FIGS. 4 and 5, the breading cylinder 14 is provided with a plurality of rectangular openings 64 spaced from each other and arranged cicumferentially around the breading cylinder slightly to the rear of the forward end 66 of the breading cylinder 14. These rectangular openings permit flour and flour lumps to pass through the breading cylinder before the breaded pieces of chicken pass out of the end 66. As best shown in FIG. 1, the flour and flour lumps drop onto a rear portion 68 of the wire rack 22. The rear portion 68 of the wire rack is separated from the forward portion thereof by means of a divider 70. Returning now to consideration of FIGS. 4 and 5, the right-hand end 72 of the breading cylinder 14 is provided with a substantially rectangular opening 74 to accommodate a flour scoop 76 which will be described in greater detail hereinafter. Slightly to the rear of the center of the breading cylinder 14 there is provided an enlarged ring or collar 78, which has a pair of diametrically opposed holes 80 therein for a purpose which will be described hereinafter.

The front circular end 81 of the main cylinder 12 is provided with a central circular opening 82 of substantially the same diameter as the external diameter of the right-hand end 72 of the breading cylinder 14. Surrounding the central opening 82 is a forwardly extending circular sleeve 84 having an internal diameter somewhat larger than the diameter of the hole 82 and substantially equal to the outer diameter of the collar 78. Within the main cylinder 12 and slightly to the rear of the center thereof is provided a circular partition 86. The partition 86 is provided with a central opening 88 surrounding which is a forwardly projecting concentric sleeve 90 whose inner diameter is slightly larger than the diameter of the circular opening 88. The rear end 92 of the main cylinder 12 is also circular and is provided with a concentric circular opening 94 which is adapted to register with the lower end of the chute 60 in the operative condition shown in FIG. 1.

The exploded view of FIG. 5 also shows a perforated cylinder 96 having a main cylindrical body 98 provided with a plurality of holes therein and a circular flange 100 located at the forward end thereof. The external diameter of the cylindrical portion 98 is substantially equal to the inner diameter of the opening 88 on the partition 86 and the external diameter of the circular flange 100 is substantially equal to the inner diameter of the sleeve 90. The rear edge 102 of the perforated cylinder 96 is provided with a pair of diametrically opposed recesses 104 adapted to hold a pair of scoops 106 which constitute the pickup means for the egg wash as will hereinafter appear.

A breading spiral 108 is also provided and is adapted to be inserted inside the breading cylinder 14. The breading spiral is composed of three circular rings 110 spaced from each other as shown and a plurality of longitudinal rods 112, all of which are welded to the rings 110. A spiral vane 114 is located within the open cylindrical structure formed by the rods 112 and the rings 110 and is welded to the rings and rods to provide a structurally rigid assembly. An egg wash spiral 116 is also provided and this is adapted to be inserted within the perforated cylinder 96. The egg wash spiral is composed of a pair of spaced rings 118 connected together by means of a plurality of longitudinal rods 120. A spiral vane 122 is located within the open cylindrical structure formed by the rings 118 and the rods 120. The rings, rods, and vane are conveniently welded together to form a structurally rigid assembly. Finally, the exploded view of FIG. 5 shows a first O-ring 124 adapted to be received over the right-hand cylindrical portion 72 of the breading cylinder 14 adjacent the collar 78, and a second O-ring 125 adapted to be received on the perforated cylinder 98 adjacent the flange 100.

Figure 6:
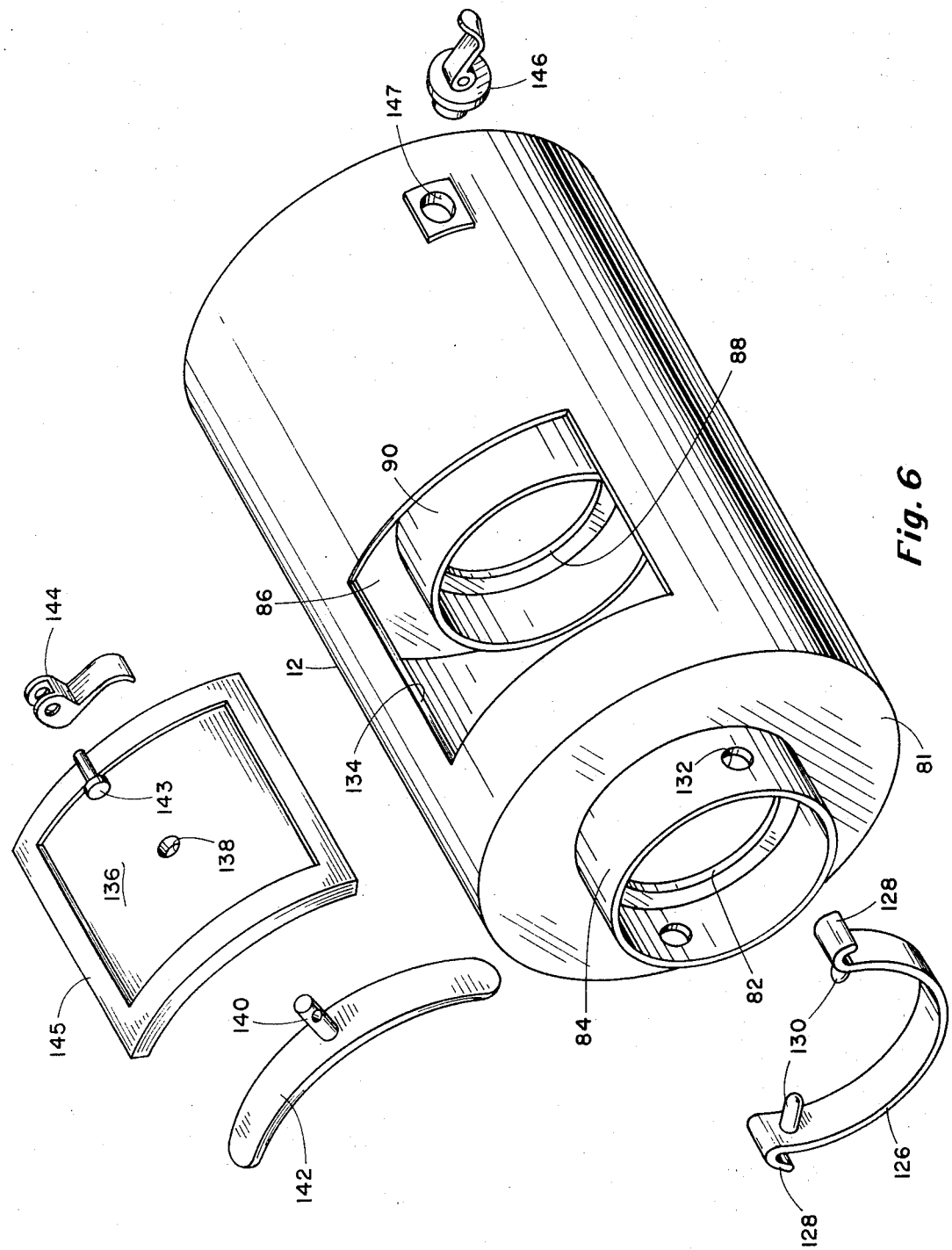
FIG. 6 is an exploded view of the main cylinder and certain of its associated parts.

FIG. 6 shows a retainer clamp 126 in the form of a semi-cylindrical steel band or strap having the resilience of spring steel. The ends of the retainer clamp are provided with outwardly projecting ears 128 to permit manipulation of the clamp. Adjacent the ends of the retainer clamp 126 are a pair of oppositely disposed and inwardly projecting lugs 130. These lugs are adapted to project through a pair of oppositely disposed openings 132 in the sleeve 84 and also into the openings 80 on the collar 78.

The main cylinder 12 is provided with a rectangular access opening 134 and a curved rectangular door 136 adapted to overlie and seal the opening 134. The rectangular door 136 is provided with a central circular opening 138 on which is slidably received a rod 140. At the inner end of the rod 140 is mounted a curved lockbar 142, and at the other end of the rod 140 is mounted the handle 144 by means of the pin 143 that passes through openings in the handle 144 and in the upper end of the rod 140. Turning of the handle 144 is an eccentric action. In the position shown in FIG. 6, handle 144 is turned such that the lockbar 142 is closest to the cover plate 136 so that the latter is locked firmly in place. If the handle 144 were turned 180° counterclockwise from the position shown in FIG. 6, then the cover would be in the unlocked position and could be easily removed. Preferably, a gasket 145 surrounds the peripheral edge of the cover plate 136 to provide an effective seal. A plut 146 is removably mounted in a suitable opening 147 in the side of the main cylinder 12 in the region of the egg wash area for the purpose of introducing egg wash solution into the interior of the main cylinder 12.

The assembly of main cylinder 12, breading cylinder 14, perforated cylinder 96 and associated components is adapted to rest on four identical rollers each identified by the reference character 148 (only two of which are shown in FIG. 1). The rollers 148 are adapted to engage the end edges of the main cylinder 12 on opposite sides of the main cabinet 10. At least one pair of axially aligned rollers is adapted to be driven and, preferably, the other pair of axially aligned rollers 148 is free wheeling. The driven rollers 148 are driven by a motor (not shown) through belts, chains or gears (not shown) in any well-known manner.

The egg wash pickups 106 are simply in the form of rectangular scoops having curved fingers 150 and adapted to be received in the recesses 104.

Figure 7:
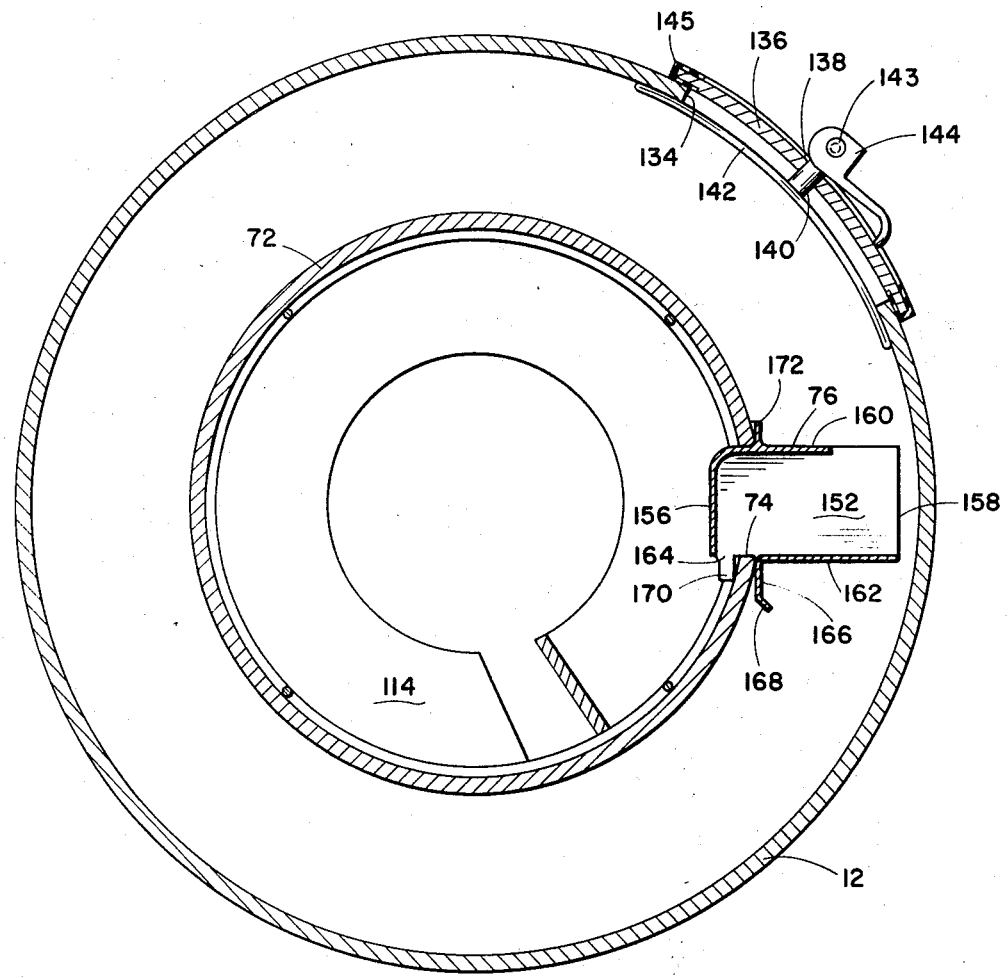
FIG. 7 is an enlarged sectional view through the main cylinder and breading cylinder showing details of the flour scoop and the access door.
Figure 8:
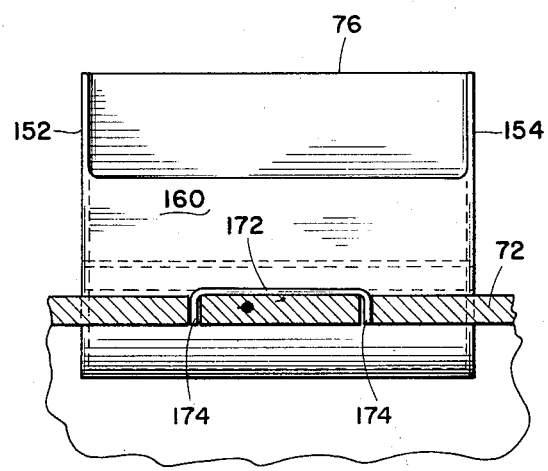
FIG. 8 is a sectional view, looking downwardly on the flour scoop shown in FIG. 7, showing the details of the relationship between the flour scoop and the breading cylinder.
Figure 9:
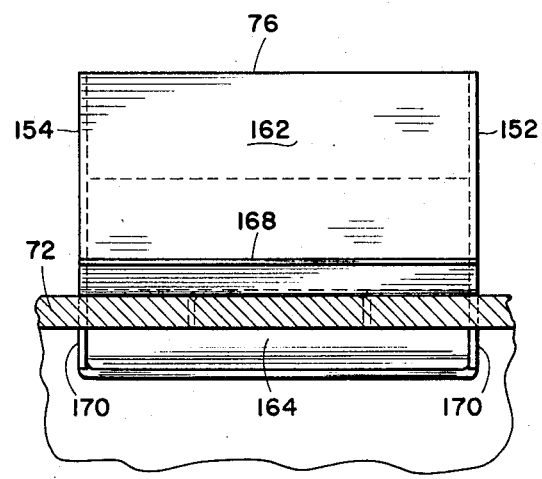
FIG. 9 is a view similar to FIG. 8, but taken from below the flour scoop in FIG. 7.

The flour scoop is provided with a pair of parallel and substantially rectangular side walls 152 and 154 and a substantially rectangular end wall 156 opposite an open end 158. The flour scoop 176 is also provided with a top wall 160 which connects with the end wall 156, but which terminates at a position spaced from the open end 158 as best shown in FIG. 7. The flour scoop is also provided with a bottom wall 162 which extends from the open end 158 to a position spaced from the end wall 156. The space between the bottom wall 162 and the end wall 156 provides an opening 164 which permits flour to enter the interior of the right-hand portion 72 of the breading cylinder 14. The edge of the bottom wall 162 adjacent the opening 164 is provided with a vertically downwardly projecting flange 166 which terminates in an inclined lip 168. The purpose of the flange 166 and inclined lip 168 is to facilitate the positioning of the flour pickup 76 in the opening 74. When the flour scoop 76 is properly positioned in the opening 74, the upper end of the flange 166 will bear against the outside of the cylindrical portion 72 adjacent the opening 74. The side plates 152 and 154 are provided with downwardly projecting tabs 170 which are adapted to bear against the inner surface of the cylindrical portion 72 when the flour scoop 76 is properly positioned in the opening 74.

The top plate 160 is provided with a vertically upwardly projecting flange 172 which is provided with a pair of rearwardly projecting ears 174. The ears 174 are received in a pair of narrow slots 176.

All of the metallic parts described above which come in contact with the chicken, the egg wash or the flour are preferably made of stainless steel.

ASSEMBLY

In order to assemble the main cylinder 12, the breading cylinder 14 and the perforated cylinder 96, the operator first slides the O-ring gasket 125 onto the perforated cylinder 96 until it abuts against the flange 100. Then the egg wash spiral 116 is inserted into the perforated cylinder. Now the perforated cylinder assembly is inserted into the main cylinder 12 through the opening 82 all the way into the egg wash chamber until the cylindrical portion 98 has passed at least partway through the opening 88 in the partition 86. At this point, the egg wash pickups 106 are attached to the perforated cylinder 96 by sliding the fingers 150 over the recesses 104. The perforated cylinder assembly is now pushed all the way into the egg wash chamber until the flange 100 is received within the sleeve 90 and the O-ring 125 abuts against the partition 86.

Next, the O-ring 124 is suitably lubricated, as with shortening, and slid over the rear portion 72 of the breading cylinder 14 until the O-ring abuts against the collar 78. Now the breading spiral 108 is inserted into the breading cylinder 14 and this assembly is inserted into the opening 82 until the collar 78 is received within the sleeve 84 and the O-ring 124 abuts against the front end 81 of the main cylinder 12. At this point, the right-hand end of the breading cylinder will be received in the sleeve 90 closely adjacent the circular flange 100. The cylinder 14 is turned until the opening 74 is in alignment with the opening 134. Now the flour pickup 76 is inserted in the opening 74 through the access opening 134. Note that it is impossible to get the flour pickup 76 in backwards or upside down because the slots 176 have to match with the ears 174. At this point, the breading cylinder 14 is rotated with respect to the main cylinder 12 in a direction indicated by the arrow in FIG. 1 until the holes 80 in the collar 78 are in alignment with the holes 132 in the sleeve 84. Now the retainer clamp 126 is placed over the sleeve 84 and opened up slightly by pulling on the ears 128 until the lugs 130 are positioned over the holes 132. When the retainer clamp is now released, lugs 130 will pass through the holes 132 into the holes 80 and thus lock the breading cylinder 14 into position with respect to the main cylinder 12. The resulting assembly can now be placed on the main cabinet 10 so that the front and rear edges of the main cylinder 12 are resting on the rollers 148. After suitable egg wash solution has been introduced and the proper quantity of flour introduced through the opening 134, the plug 146 is sealed in position and the door 136 is sealed in position over the opening 134.

To disassemble, merely reverse the steps described above.

OPERATION

If it is desired to bread pieces of raw chicken with the device disclosed above, a suitable quantity of egg wash solution is introduced into the annular space between the main cylinder 12 and the perforated cylinder 96 by pouring the solution into the opening 147 in the main cylinder. Thereafter, the plug 146 is inserted and locked in position. A suitable quantity of flour (with seasoning if desired) is inserted through the access opening 134, after which the door 136 is locked in position. Power is now turned on so that the main cylinder 12 commences to rotate, the feeder 16 commences to rotate, and the flour sifter 28 commences to reciprocate. Now chicken pieces are loaded into the compartments 44 of the feeder 16. As the feeder wheel 42 rotates, pieces of chicken will pass into the perforated cylinder 96 through the chute 60. The egg wash spiral 116 will cause the chicken pieces to pass forwardly through the perforated cylinder, during which time egg wash solution is poured over these pieces of chicken. The wetted pieces of chicken now pass into and through the breading spiral by virtue of the action of the breading spiral 108. As the pieces of chicken initially pass through the breading cylinder, they are coated with flour which passes through the opening 74 in which the flour scoop 76 is mounted. The pieces of chicken will continue to mix with the flour as they pass through the remainder of the breading cylinder from which they are discharged at the forward end thereof. Flour and flour lumps will pass through the spaced rectangular openings 64, and the flour and flour lumps can be sifted by the sifter 28.

At the end of the day, or whenever the breading device of the present invention is no longer in use, the same can be simply disassembled and the parts washed and/or rinsed out in readiness for use on the next day or occasion.

Whereas the present invention has been described in particular relation to the drawings set forth herein, it should be understood that other and further modifications, apart from those shown or suggested herein, may be made within the spirit and scope of this invention.

What is claimed is:

1. Apparatus for breading pieces of raw chicken or the like comprising a main cylinder rotatable about a horizontal central axis and having an apertured front circular wall, an apertured rear circular wall and an apertured circular partition within said main cylinder substantially parallel to and spaced between said front and rear walls, the space between said circular partition and said rear wall defining an egg-wash chamber, the space between said circular partition and said front wall defining a flour chamber; a perforated cylinder mounted in said circular partition concentrically with said main cylinder and projecting into said egg-wash chamber; egg-wash scoop means mounted on the end of said perforated cylinder adjacent said rear wall; an elongated breading cylinder mounted in said front wall substantially concentric with said main cylinder and having a portion projecting into and through said flour chamber, the portion of said breading cylinder projecting into said flour chamber terminating adjacent said perforated cylinder, said breading cylinder having a portion projecting forwardly and externally of said main cylinder; a flour scoop mounted on the portion of said breading cylinder within said main cylinder and passing through an opening in the wall of said breading cylinder; means for releasably locking said breading cylinder to said front wall of said main cylinder; and spiral vane means mounted in said perforated cylinder and in said breading cylinder throughout the combined lengths thereof; whereby, as said main cylinder is rotated about its horizontal central axis, pieces of raw chicken can be advanced from an opening in said rear wall through said perforated cylinder and said breading cylinder in series and discharged from the forward end of said breading cylinder and, whereby, as said main cylinder is rotated about its horizontal central axis, said egg-wash scoop means will cause egg-wash solution to pass through the perforation in said perforated cylinder onto said pieces of raw chicken and said flour scoop will cause flour to pass onto the surfaces of said pieces of raw chicken as they pass through said breading cylinder.

2. Apparatus for breading pieces of raw chicken as set forth in claim 1 wherein said means for releasably locking said breading cylinder to said front wall of said main cylinder comprises a forewardly projecting sleeve mounted on the front wall and surrounding the aperture in said front wall, said breading cylinder being provided with a circular collar receivable in said sleeve, said sleeve and said collar each being provided with diametrically oppositely positioned holes whereby the holes in said sleeve can be positioned in alignment with the holes in said collar, and a semi-circular and resilient band having oppositely disposed and radially inwardly projecting lugs adjacent the ends of said band, said lugs being insertable into the aligned holes of said sleeve and said collar for releasably locking said breading cylinder to the front wall of said main cylinder.

3. Apparatus for breading pieces of raw chicken as set forth in claim 1 wherein said breading cylinder is provided with a substantially rectangular flour scoop opening in the portion of said breading cylinder projecting into said flour chamber, said flour scoop opening having a pair of spaced slots along one side thereof; said flour scoop having a pair of parallel and substantially rectangular side walls, a substantially rectangular end wall, an open end opposite from said rectangular end wall, a top wall connecting with said end wall and said side walls and terminating at a position spaced from said open end, a bottom wall connected to said side walls on the opposite sides thereof from said top wall, said bottom wall extending from said open end to a position spaced from said rectangular end wall, a first flange extending downwardly from said bottom wall at the position thereof spaced from said rectangular end wall, a second flange extending upwardly from said top wall opposite from said first flange, said second flange having a pair of rearwardly projecting ears adapted to be received in the spaced slots in said flour scoop opening.

4. Apparatus for breading pieces of raw chicken or the like comprising a main cylinder rotatable about a horizontal central axis and having a circular front wall with a central opening therein, a circular rear wall with a central opening therein, and a circular partition with an opening therein spaced within the main cylinder between the front wall and rear wall, a first forwardly projecting circular sleeve mounted on said partition and surrounding the opening therein; a second forwardly projecting circular sleeve mounted on said front wall and surrounding the opening therein; a perforated cylinder having an outer diameter substantially equal to the central opening in said partition and having an outwardly projecting circular flange at one end thereof, the outer diameter of said circular flange being substantially equal to the ineer diameter of said first circular sleeve, whereby said perforated cylinder can be inserted through the opening in said partition into the space between said partition and said rear circular wall with said circular flange being received within the sleeve on said partition, egg-wash scoop means mounted on the end of said perforated cylinder adjacent said rear wall, an elongated breading cylinder having an outer diameter substantially equal to the inner diameter of the circular opening in said circular front wall of said main cylinder, an outwardly projecting collar mounted on said breading cylinder intermediate the ends thereof and having an outer diameter substantially equal to the inner diameter of the circular sleeve on said front circular wall of said main cylinder, whereby said breading cylinder can be inserted into said main cylinder through the circular opening in said front wall until the inserted end abuts against the flange of said perforated cylinder and said collar is received within the sleeve on said front wall of said main cylinder, a flour scoop opening on the cylindrical wall of the inserted portion of said breading cylinder and a flour scoop mounted in said scoop opening, said breading cylinder being provided with a forward extension having a plurality of spaced openings around the circumference thereof adjacent the remote end of said extension; a first separate spiral vane insertable in said perforated cylinder and extending substantially throughout the length thereof; a second separate spiral vane insertable in said breading cylinder and extending substantially throughout the length thereof; said second forwardly projecting sleeve having a pair of diametrically oppositely positioned radial holes therein, said collar having a pair of holes therein alignable with the holes in said second sleeve; and a semi-circular resilient locking band having oppositely disposed and radially inwardly projecting lugs adjacent the end of said band and being insertable into the holes in said sleeve and said collar for locking said breading cylinder to said main cylinder.

* * * * *